United States Patent [19]
Pittore

[11] Patent Number: 5,821,932
[45] Date of Patent: Oct. 13, 1998

[54] DYNAMIC DIALOG BOX FACILITY FOR GRAPHICAL USER INTERFACE FOR COMPUTER SYSTEM VIDEO DISPLAY

[75] Inventor: William F. Pittore, Lexington, Mass.

[73] Assignee: Sun Microsystems, Inc.

[21] Appl. No.: 444,824

[22] Filed: May 18, 1995

[51] Int. Cl.[6] .................................................. G06F 3/00
[52] U.S. Cl. .......................................... 345/347; 345/975
[58] Field of Search .................................. 395/155–161; 345/333, 334, 347, 975

[56] References Cited

U.S. PATENT DOCUMENTS

| | | | |
|---|---|---|---|
| 5,220,675 | 6/1993 | Padawer et al. | 345/333 |
| 5,315,703 | 5/1994 | Matheny et al. | 345/507 |
| 5,341,293 | 8/1994 | Vertelney et al. | 707/530 |
| 5,555,370 | 9/1996 | Li et al. | 345/334 |
| 5,604,852 | 2/1997 | Jefferson et al. | 345/342 |

OTHER PUBLICATIONS

Linux operating System, screen dumps from http://www.p-lig.org/xwinman/ and http://mars.Superlink.net/ekahler/fvwml.desktop.html.

Carl, Mike, "A Polished New Looking Glass," UNIX Today Feb. 1991, p. 46.

*Primary Examiner*—A. Katbab
*Attorney, Agent, or Firm*—Richard A. Jordan

[57] ABSTRACT

A computer system includes a information type source file, an information value file and a dynamic dialog box processor. The information type source file includes a plurality of text entries in, for example, ASCII text form, which can be easily edited by an operator. The information value file includes a plurality of value entries each for storing a value used in other processing by the computer system. The dynamic dialog box processor uses the text entries from the information type source file to generate a dialog box for display to an operator, and receives information values provided by an operator in connection with respective information text entries to update the values in the value entries in the information value file. Since the ASCII text entries in the information type source file can be easily edited, the particular types of information to be provided through the dynamic dialog box can be easily modified by the operator with a minimum of programming and debugging effort.

50 Claims, 6 Drawing Sheets

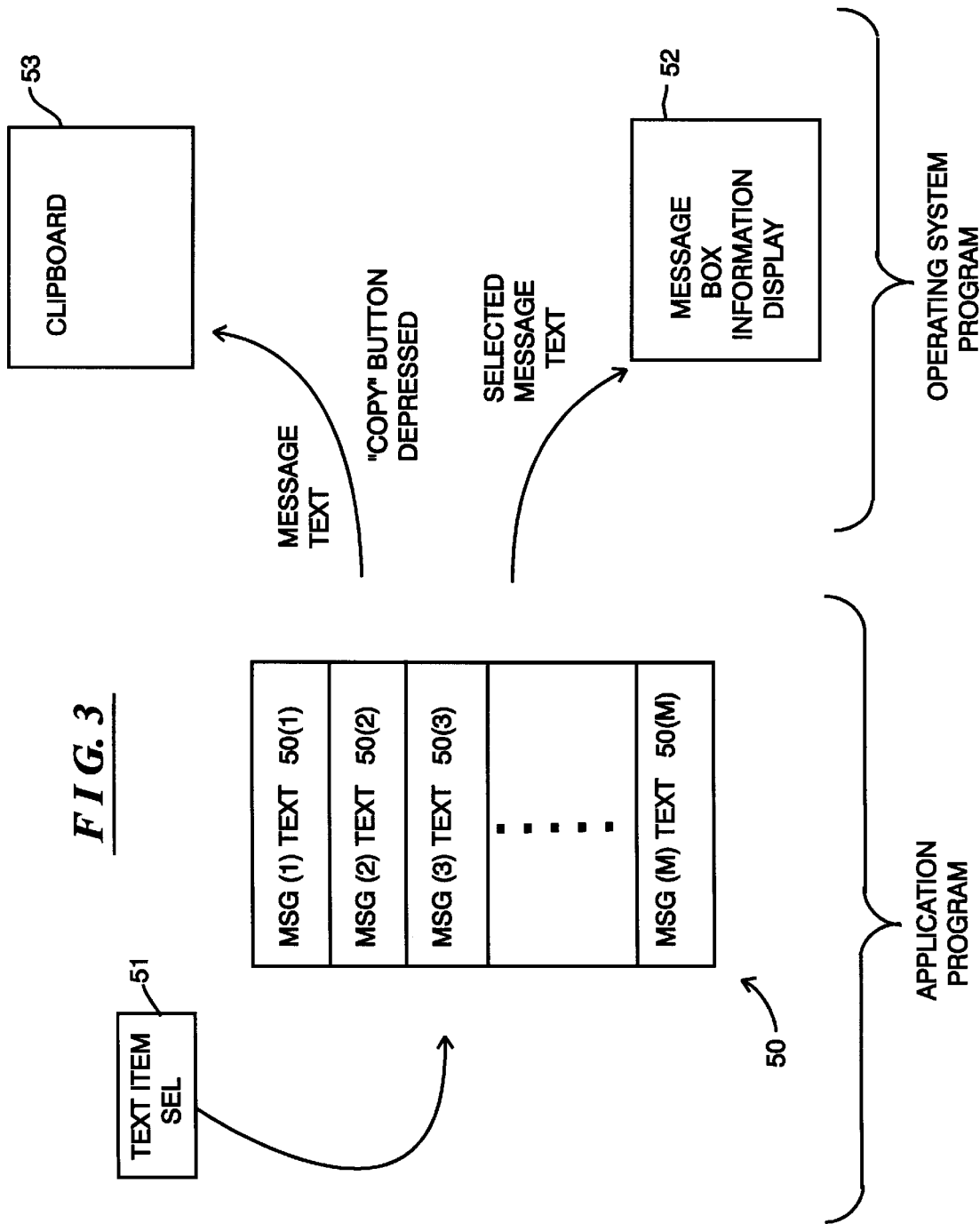

DYNAMIC DIALOG BOX FACILITY FOR GRAPHICAL USER INTERFACE FOR COMPUTER SYSTEM VIDEO DISPLAY

FIELD OF THE INVENTION

The invention relates generally to the field of digital computer systems, and more particularly to graphical user interfaces for video displays for digital computer systems. The invention particularly provides a new and improved "dynamic dialog box" facility providing easily-developed and -modified dialog boxes. Contents of a dialog box, in particular the names of the various types of information to be provided through the dialog box are listed in a source file in ASCII text or equivalent, which may be modified. Modification of the text in the source file causes corresponding modifications in the names of the types of information to be provided through the dynamic dialog box.

BACKGROUND OF THE INVENTION

In the past, using a computer system often required a user to remember complex and sometimes arcane commands or keystroke combinations in order to enable a program to perform useful processing. In an attempt to reduce these complexities, "graphical user interfaces" have been developed, which provide a number of facilities which simplify computer use in a number of ways. At a minimum, a graphical user interface typically provides facilities by which the commands which a program can accept may be easily displayed to an operator, and the operator may select ones of the commands to be executed. This eliminates the necessity of the operator remembering the commands that the program can accept and also eliminates command entry errors, such as typographical errors, which may occur if the operator has to type in the commands manually. The primary graphical user interface facility for an applications program generally is organized as a window, with which the operator interacts with the program, entering data for processing, entering commands and viewing processed data. In addition, graphical user interfaces provide facilities such as dialog boxes, which may be displayed by a user in the event that program needs specific operator input such as values for various parameters for commands issued by the operator, and message boxes which may be used by a program to display messages to an operator if it detects certain conditions such as errors. One problem with current graphical user interfaces, however, is that changes to the information which may be required to be provided through a dialog box often requires a relatively substantial degree of programming to accomplish, which increases the risk of programming errors, or "bugs."

SUMMARY OF THE INVENTION

The invention provides a computer system providing a new and improved "dynamic dialog box" facility for use in connection with a graphical user interface which enables easy modification of the types of information to be provided through the dialog box.

In brief summary, the computer system includes a information type source file, an information value file and a dynamic dialog box processor. The information type source file includes a plurality of text entries in, for example, ASCII text form, which can be easily edited by an operator. The information value file includes a plurality of value entries each for storing a value used in other processing by the computer system. The dynamic dialog box processor uses the text entries from the information type source file to generate a dialog box for display to an operator, and receives information values provided by an operator in connection with respective information text entries to update the values in the value entries in the information value file. Since the ASCII text entries in the information type source file can be easily edited, the particular types of information to be provided through the dynamic dialog box can be easily modified by the operator with a minimum of programming and debugging effort.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 schematically represents various data structures useful with the invention.

DETAILED DESCRIPTION OF AN ILLUSTRATIVE EMBODIMENT

Figure 1:
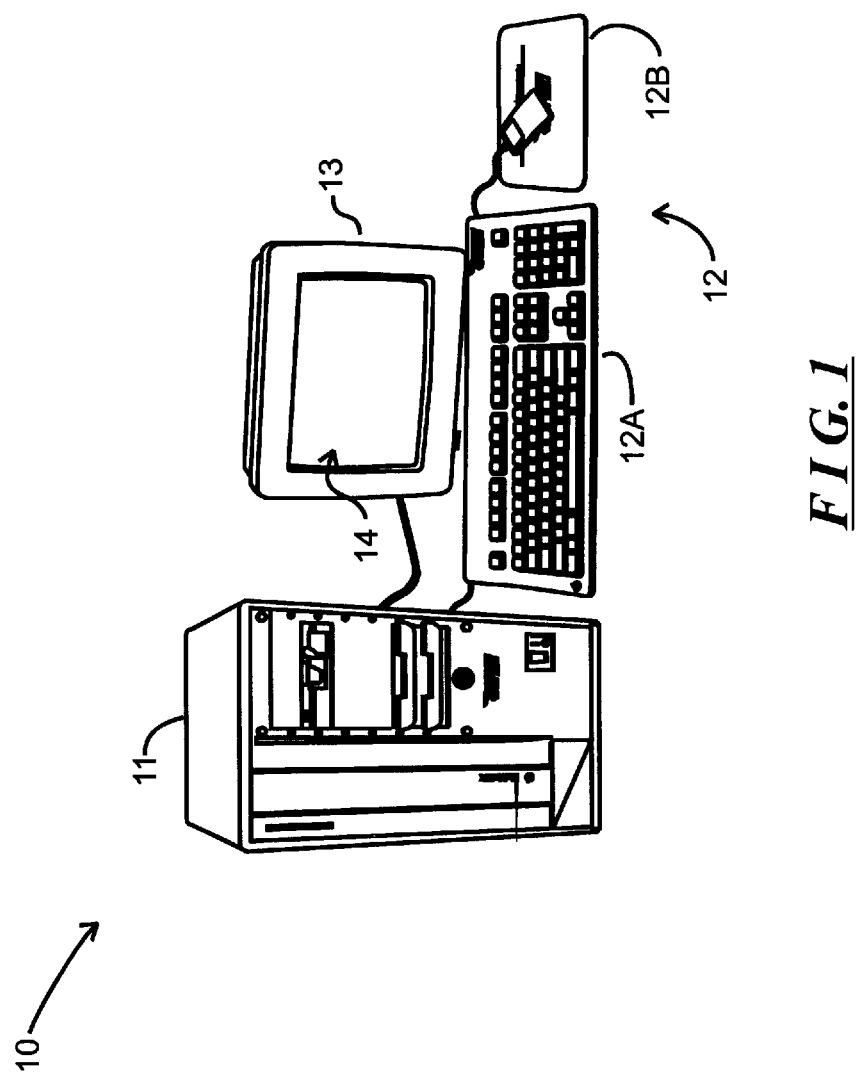
FIG. 1 depicts an illustrative computer system incorporating a graphical user interface in accordance with the invention for displaying information to an operator.

FIG. 1 depicts an illustrative computer system 10 incorporating a graphical user interface, in accordance with the invention, for displaying information to an operator. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows," one embodiment of which will be described in greater detail below in connection with FIG. 2. Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

Figure 2:
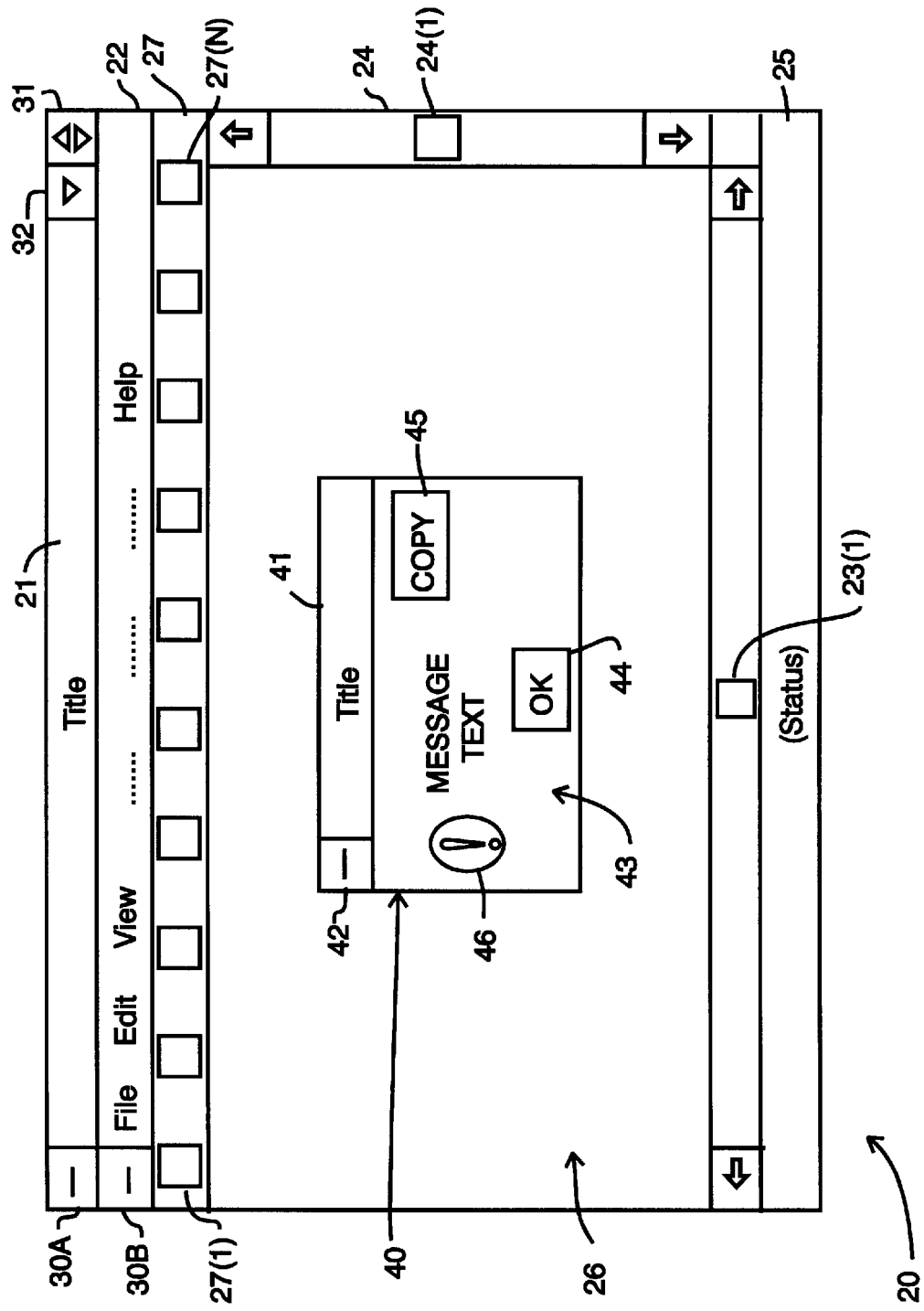
FIG. 2 is a schematic representation of a window of the graphical user interface, including a dynamic message box constructed in accordance with the invention.

As noted above, the video display device 13 displays information on screen 14 to the operator in the form of a graphical user interface, in which information is displayed in the form of a window. Typically in a graphical user interface, each applications program is provided with a separate window in which it may enable display of information to the user, which information may include information as processed by the applications program as well as information which the user has provided to the applications program for processing through an operator input element 12. An illustrative window 20 useful in one embodiment of the graphical user interface is depicted in FIG. 2. With reference to FIG. 2, window 20 includes a number of window elements which are typical of windows that may be used in connection with applications and other programs which run under the Microsoft Windows™ operating system, including a title bar 21, a menu bar 22, horizontal and vertical scroll bars 23 and 24, and a status bar 25, as well as an information display area 26. The title bar 21 identifies the title of the applications program, and the menu bar 22 provides a number of textual pull-down menu items which an operator can use to issue commands to control the applications program. As is conventional, the user may, by inputting appropriate keystroke patterns on the keyboard 12A or by controlling the position of an on-screen pointer (not shown) by manipulating the mouse 12B, select and actuate ones of the menu items and thereby issue the corresponding commands to the applications program. In addition, a window 20 may include a button bar 27 including a number of buttons 27(1) through 27(N) each of which may also be associated with a command for controlling the applications program; the operator can issue a command to the applications program through the button bar 27 by actuating the appropriate button in a similar manner.

Window 20 includes several other elements, including system menu elements 30A and 30B and two window control push-buttons 31 and 32. The system menu elements 30A and 30B provide a system menu which enables the operator to issue commands to the operating system program to control the computer system 10. The window control push-buttons 31 and 32 enable the operator to control various aspects of the window 20. For example, if the operator inputs a predetermined keystroke combination using the keyboard 12A or suitably manipulates the mouse 12B to actuate the window control push-button 31, the window 20 may switch between occupying the entire screen 14 of the video display device 13, and occupying a defined area, or "window" which is somewhat less that the full screen. If the operator similarly inputs a predetermined keystroke combination or suitably manipulates the mouse 12B to actuate the window control push-button 32, the window 20 may minimize itself to an icon (not shown) displayed by the video display device 13.

The applications program can use the information display area 26 to display program information to a user. If the applications program has more program information which may be displayed than can be displayed in the information display area 26, the window 20 may provide the horizontal and vertical scroll bars 23 and 24 to enable the user to scroll through the information. Each scroll bar 23 and 24 includes a slider 23(1), 24(1) whose horizontal or vertical position can be controlled by the operator by manipulating the on-screen mouse pointer to control the portion of the applications program's information that is displayed on the video display device 13.

While operating, the applications program may, in addition to the window 20, make use of a number of other graphical display devices, including dialog boxes, message boxes and the like. The applications program may use a message box to display a variety of types of information, including but not limited to error messages if the applications program detects error conditions in execution of commands or other processing. When a command requires entry by an operator of values for various parameters and other control information for execution, an applications program may use a dialog box to obtain such values from the operator. Typically, a dialog box will include several window elements which are similar to those described above in connection with window 20, including a title bar and an information display area, but in the case of a dialog box the information display area will be constrained to identify the types of parameters and other control information to be supplied by the operator, as well as blank areas in which the operator can insert the parameter and control information values.

Typically, the structure of a dialog box for a particular command, that is, the particular types of information to be provided by the operator are fixed by the command, since they are determined by the various parameters whose values are required for the command. The invention provides for a dialog box whose structure is not fixed, but is instead dynamically modifiable based on the contents of a source file which, in one embodiment, is an ASCII text file containing text to be displayed in the dialog box. One embodiment of such a dynamic dialog box, namely, dynamic dialog box 40, is depicted in FIG. 2. As shown in FIG. 2, the message box 40, like window 20, includes a title bar 41, a system menu element 42 and an information area 43. The title bar identifies the program for which the dynamic dialog box was generated, which may be an applications program or the operating system program. If the computer system 10 is a multi-tasking system, in which the computer system can process a number of applications programs concurrently, and display windows such as window 20 for all or only some of the applications programs being processed, it will be appreciated that the applications program for which the dynamic dialog box 40 was generated need not be associated with an applications program whose window(s) are being displayed, and so the title bar will, if the dynamic dialog box was generated for an applications program, provide the identification of the applications program to the operator. The system menu 42, like system menu elements 30A and 30B, enables the operator to issue commands to the operating system program, including, for example, commands to enable the operating system program to move the dynamic dialog box 40 to another position on the screen 14 of the video display device 13 and to close the dynamic dialog box 40 thereby enabling the box 40 to be removed from the display and previously-displayed material overwritten by the box 40 returned to the display.

The information display area 43 for the dynamic dialog box 40 depicted in FIG. 2 includes several information entry elements 44 and 45, which will be described below, as well as several push-buttons, including an OK push-button 50, a CANCEL push-button 51 and a HELP push-button 52. In using the dynamic dialog box 40, an operator will enter information using the information entry elements 44 and 45, and, when he or she determines that the information entered is correct may actuate the OK push-button 50 to enable the computer system 10 to accept and use the entered information. On the other hand, if the operator determines that the computer system should not accept and use information he or she has entered into the dynamic dialog box 40, he or she may actuate the CANCEL push-button 51. Following actuation of either the OK push-button 50 or the CANCEL push-button 51, the computer system will remove the dynamic dialog box from the screen 14 and restore the screen image to its condition before the dynamic dialog box 40 was displayed. The operator may actuate the HELP push-button to enable display of help information to assist in using the dynamic dialog box 40.

As indicated above, the operator will enter information into the dynamic dialog box using the information entry elements 44 and 45 in the illustrative dynamic dialog box 40 depicted in FIG. 2. By way of background, in one embodiment the dynamic dialog box 40 facilitates entry of information into a configuration database used in controlling a computer network. In that configuration database, an illustration of which is shown in FIG. 3 as a "section/properties value file" 60, the database is divided into a plurality of sections 61(A) through 61(I) (generally identified by reference numeral 61($i$)) with each section 61($i$) having a header 61($i$)(0) which identifies the section and a number of entries 61($i$)($j$) each of which stores a property name and a value which relates to the configuration and operation of the network. (In reference numeral 61($i$)($j$), "j" is an index which may take on values from "A" to the number of values in the respective section.) The values in the entries 61($i$)($j$) is, in turn, associated with the contents of a section/property name file 70, which, in the embodiment which runs in association with the Microsoft Windows™ operating system, is in the form of an ASCII text file such as an "xxx.ini" file, where "xxx" is a file name. The section/property name file 70 has a header section 71 and series of options sections 72(A) through 72(I) (generally identified by reference numeral 72($i$)). The header section 71 comprises a series of entries 71(A) through 71(I) (generally identified by reference numeral 71($i$)), which identify the series of section names for the various sections 61($i$) in the section/property value file 60. The section names for the sections 61($i$) may be also contained in the headers 61($i$)(0) for the series of sections 61($i$) of the section/property value file 60 to identify and demarcate the various sections of that file 60. Each options section 72($i$), in turn, comprises a header 72($i$)(0) which contains a value that identifies the section by section name, and one or more entries 72($i$)($j$) each of which contains a property name. (In reference numeral 72($i$)($j$), "j" is an index which extends from "A" to the number of properties associated with the respective section.) Each property identified in an entry 72($i$)($j$), in turn, is associated with a value in the correspondingly-indexed entry 61($i$)($j$) in the section/property value file 60.

By way of example in illustrating the section/property value file 60 and the section/property name file 70, in the aforementioned embodiment in which the dynamic dialog box 40 facilitates entry of information into a configuration database used in controlling a computer network, the properties named in the entries 72($i$)($j$) may be such properties as "Subnet Mask,", "Broadcast Address," "Router Address", "Domain Name," various Internet protocol items, server items, timeout information, and so forth, which may be divided into sections which may be entitled Connection Options, Server Options, Internet Protocol Layer Options, Network Encapsulation Options, Time Options, and the like, whose names will be listed in the header 71 and individually set forth in the headers 72($i$)(0) of the respective sections. In the section/property value file 60, the section name for each section 61($i$) will also be set forth in the header 61($i$)(0) of the respective section, and the values for the series of properties in the section will be listed in the series of entries 61($i$)($j$), in the order listed in the entries 72($i$)($j$) of the respective section 72($i$) of the section/property name file. The property name may also be listed in the entry 61($i$)($j$) along with its value.

Returning to FIG. 2, as noted above, the dynamic dialog box 40 includes information entry elements 44 and 45 which are displayed in the information entry area 43. The information entry element 44 is a table listing of section names which correspond to the contents of the header 71 of the section/properties name file 70. An operator may, in a conventional way, select one of the names in the table displayed in information entry element 44, and the list of property names from the entries 72($i$)($j$) of the section 72($i$) of the section/property name file 70 whose section name in header 72($i$)(0) is associated with the selected section name, will be displayed in information display element 45. In addition, information display element 45 will also display the current values for the respective properties, which are obtained from entries 61($i$)($j$) of the corresponding section 61($i$), if any, of the section/property value file 60. If no section 61($i$) is associated with the name of a selected section 72($i$), which may occur if the section/property name file 70 has been modified since the establishment or last update of the section property value file, then the property names will be displayed, but no values therefor will be displayed.

More specifically, the information display element 45 includes two sections, namely, a property name section 45A and a property value section 45B. The property name section 45A includes a series of entries 45A(A) through 45A(J) (generally identified by reference numeral 45A($j$), "j" being an index from "A" to the number of properties in the section being displayed) which display the series of property names from the entries 72($i$)($j$) of the respective section 72($i$) of the section/property name file 70. The property value section 45B includes a like series of entries 45B(A) through 45B(J) ((generally identified by reference numeral 45B($j$), "j" being an index from "A" to the number of properties in the section being displayed) which display the series of current property values which are associated with the property names listed in the property name section 45A. If the section name selected in the table in the information entry element 44, does not have an associated section 61($i$) in the section/property value file 60, which may occur if, for example, the section name entry 71($i$) and corresponding section 72($i$) were added to the section/property name file 70 since the establishment or last update of the section/property value file 60, then all of the entries 45B($j$) will be blank. Similarly, if a property whose name is listed in an entry 45A($j$) does not have a corresponding value in the section/property value file 60, which may occur if a change was made to the section/property name file 70 since the last time the values of the corresponding section 61($i$) of the section/property value file 60 were established or updated, the corresponding entry 45B($j$) of the property value section 45B will be blank.

After the computer system 10 has displayed the property names and values of the section, as selected in information entry element 44, in the table of the information entry element 45, the operator may update the values in the entries 45B($j$) of the property value section 45B. After finishing with updating for a section associated with a section name selected in information entry element 44, the operator may select another section name and the operations will be repeated in connection therewith. These operations may be repeated in connection with all or a subset of the section names in the information entry element 44.

At some point, the operator may actuate the OK push-button 50 to enable the computer system 10, at which point it will update the contents of the section 61(*i*) with the updated values. It will be appreciated that, in updating the section 61(*i*), the computer system 10 may enlarge or reduce the number of entries 61(*i*)(*j*) of the section 61(*i*), if the number of property names in entries 72(*i*)(*j*) in the section/property name file 70 has changed from the last time the section 61(*i*) was updated. In addition, if the section name and associated property names were added to the header 71 and an associated section 72(*i*)(*j*) since the last time the section/property value file 60 was updated, the computer system 10 may add a new section 61(*i*) associated with the new section name and associated property names, in the order in which the section names are listed in the information entry element 44. The computer system 10 will also remove the dynamic dialog box 40 from the screen 14, refresh the screen image to its condition prior to display of the dynamic dialog box 40, and allow the operator to enable other processing operations.

Alternatively, instead of actuating the OK push-button 50, the operator may actuate the CANCEL push-button 51, in which case the computer system 10 will merely remove the dyanmic dialog box 40 from the screen 14, refresh the screen image to its condition prior to display of the dynamic dialog box 40, and allow the operator to enable other processing operations, without updating the section/property value file 60.

Figure 4A:
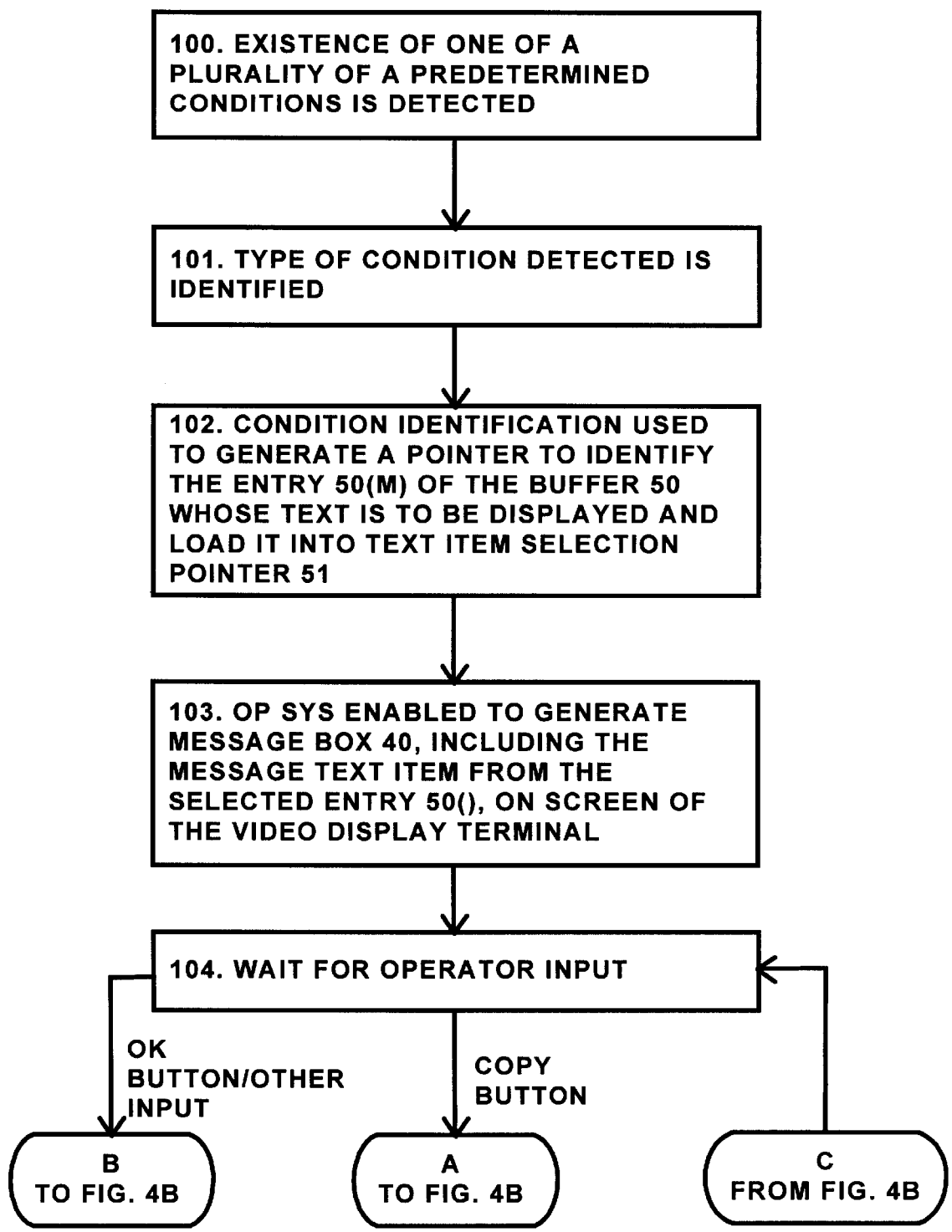
FIGS. 4A through 4C together comprise a flow chart depicting the operations performed by the computer system in connection with the invention.
Figure 4B:
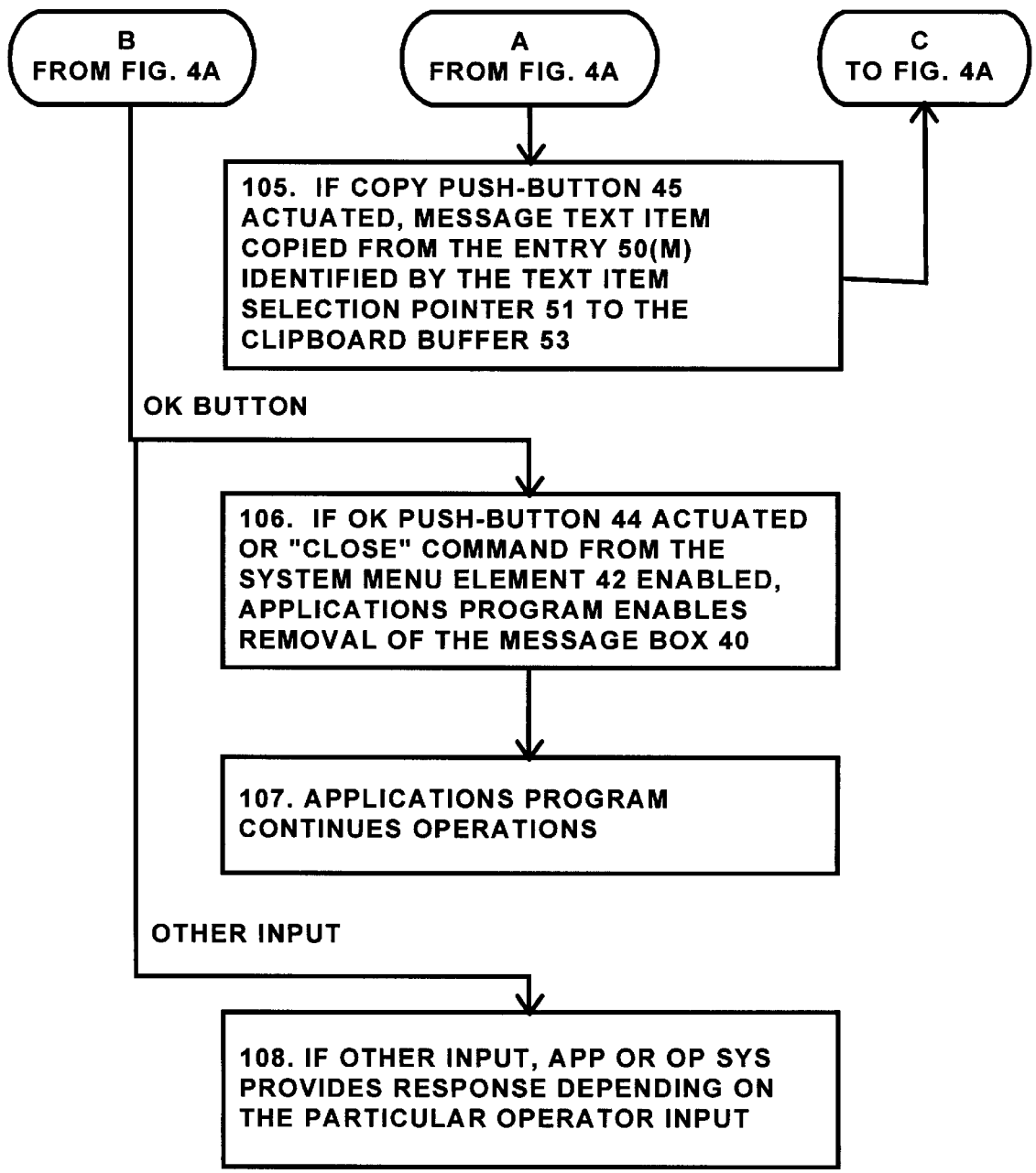
Figure 4C:
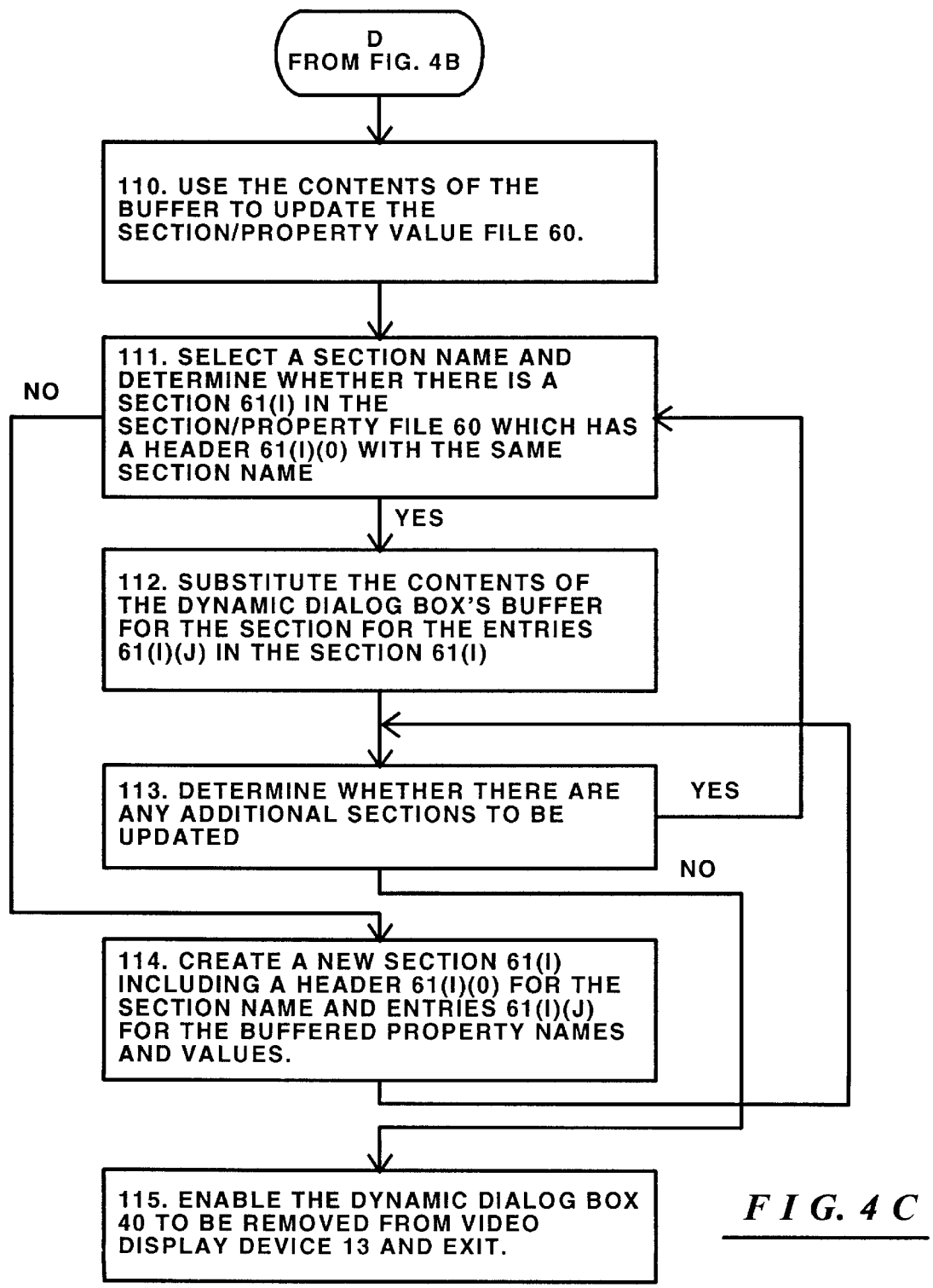

The detailed operations performed by the computer system 10 in connection with the dynamic dialog box 40 will be described in connection with the flow-chart depicted in FIGS. 4A through 4C. With reference to FIGS. 4A through 4C, when the computer system 10 initially activates the program controlling the dialog box 40, the computer system 10 obtains the section names from the entries 71(*i*) of the header 71 of the section/property name file 70 and displays them in the information entry element 44 (step 100; represented in part by the arrows associated with the "SECTION/PROP NAME REQ" and "SECTION/PROP NAME RESP" legends in FIG. 3). Thereafter, the computer system waits until the operator selects one of the section names from the information entry element 44 (step 101). When the operator selects one of the section names, the computer system retrieves the list of property names from the entries 72(*i*)(*j*) of the section 72(*i*) associated with the selected section of the section/property name file 70 and display them in the entries 45A(*j*) of the property name section 45A of the information entry element 45 (step 102; also represented in part by the arrows associated with the "SECTION/PROP NAME REQ" and "SECTION/PROP NAME RESP" legends in FIG. 3).

Thereafter, the computer system references the section/property value file 60 to determine whether a section 61(*i*) exists which has a header 61(*i*)(0) which contains a name corresponding to the section name selected in step 101 (step 103; also represented in part by the arrow Associated with the "SECTION/PROP CUR VAL REQ" legend in FIG. 3). If the computer system determines that no such section 61(*i*) exists, it leaves the entries 45B(*j*) of the property value section 45B blank (step 104) and allows the operator to enter values in the various entries 45B(*j*), and buffers the values entered by the operator in a scratchpad buffer associated with the dynamic dialog box (not shown) (step 105).

On the other hand, if the computer system determines in step 103 that a section 61(*i*) exists in the section/property value file 60 which has a header 61(*i*)(0) which contains a name corresponding to the section name selected in step 101, it sequences to step 106 to retrieve the contents of the entries 61(*i*)(*j*) (also represented in part by the arrows associated with the "SECTION/PROP CUR VALUE REQ" and "SECTION/PROP CUR VALUE RESP" legends in FIG. 3). For those entries 61(*i*)(*j*) which correspond to the property names identified in the entries 72(*i*)(*j*), the computer system 10 displays the values in the entries 45B(*j*) of the property value section 45B (step 107). The computer system then sequences to step 105, allowing the operator to update the values in the entries 45B(*j*), recording the changes made by the operator in the dynamic dialog box's buffer.

After the operator has completed updating the values in the entries 45B((*j*) of the property value section 45B (at least those values which are to be updated), he or she may (i) select another section name in the information entry element 44 to update the properties and values associated with that section, (ii) actuate the OK push-button 50 indicating that the updates are to be recorded in the section/property value file 60, or (iii) actuate the CANCEL push-button 51 indicating that the updates are to be discarded. (It will be appreciated that the operator may actuate the HELP push-button 52 at any time, and the computer system 10 will display a selected help window when it determines that the HELP push-button 52 has been actuated. The operations performed by the computer system in connection with this operation are conventional and will not be described herein.) Accordingly, while the operator is updating the values in entries 45B(*j*), the computer system, in addition to recording the changes entered by the operator in the dynamic dialog box's buffer, also monitors the information entry element 44 and push-buttons 50 and 51 (step 108). If the computer system determines in step 108 that the operator has selected another section name in the information entry element 44, it will return to step 101 to repeat the operations described above in connection with that section.

On the other hand, if the computer system determines in step 108 that the operator has actuated the OK push-button, indicating that the information entered by the operator in step 105 are to be recorded in the section/property value file 60, the computer system uses the contents of the buffer to update the section/property value file 60. In that operation, the computer system, initially selects a section which has updates buffered in the buffer (step 110) and determines whether there is a section 61(*i*) in the section/property file 60 which has a header 61(*i*)(0) with the same section name (step 111). If the computer system makes a positive determination in step 111, it substitutes the contents of the dynamic dialog box's buffer for the section for the entries 61(*i*)(*j*) in the section 61 (step 112). This serves to ensure that the section 61(*i*) of the section/property value file 60 will have only values for property names which are present in the current version of the section/property name file 70, and not for any property names which might have been present in earlier versions of the section/property name file 70. Following step 112, the computer system 10 will determine whether there are any additional sections to be updated (step 113), and if there are, it will return to step 110 to select the next section buffered in the dynamic dialog box's buffer for update.

Returning to step 111, if the computer system has determined that there is no section 61(*i*) in the section/property value file 60 for which the header 61(*i*)(0) contains a name corresponding to the name associated with the data buffered in the dyanmic dialog box's buffer, it sequences to step 114. In that step, the computer system 10 creates a new section 61(*i*) including a header 61(*i*)(0) into which it loads the section name and entries 61(*i*)(*j*) into which it loads the buffered property names and values. Following step 114, the computer system 10 will return to step 113 to determine whether there are any additional sections to be updated and if there are, it will return to step 110 to select the next section buffered in the dynamic dialog box's buffer for update.

The computer system 10 will iteratively perform steps 110 through 114 in connection with the various new and updated sections buffered in the dyanmic dialog box's buffer. At some point, the computer system will determine in step 113 that it has processed all of the new and updated sections buffered in the dynamic dialog box's buffer, at which point it will sequence to step 115 to enable the dynamic dialog box 40 to be removed from the screen 14 of the video display device 13, enable the screen to be refreshed with the image that was being displayed prior to display of the dynamic dialog box 40, and exit.

Returning to step 108, if the computer system 10 determines in that step that the operator actuated the CANCEL push-button, it will sequence directly to step 115 to enable the dynamic dialog box 40 to be removed from the screen 14 of the video display device 13, enable the screen to be refreshed with the image that was being displayed prior to display of the dynamic dialog box 40, and exit.

It will further be appreciated that numerous changes and modifications may be made to the system described above in connection with FIGS. 1 through 4. For example, the information entry area 43 may, in addition to some or all of the types of information and push-buttons described above in connection with FIG. 2, also display other types of information, push-buttons or other windowing elements which may be of interest in connection with particular types of applications. In addition, it will be appreciated that, for applications in which all of the dynamic elements, referenced herein as "property names" and "values" may be accommodated at once on a single displayed information entry element 45 (which may occur, for example, if there is a single section 72(*i*) of the section/property name file 70), the dynamic dialog box 40 need not be provided with an information entry element 44.

In addition, it will be appreciated that the invention may useful in connection with a database file which is not comprised of a plurality of sections such as sections 61(*i*), but which instead a unitary database. In that case, the property names will all be unique within the file, so that the current value of the property can be determined using only the property name, not using an additional facility such as the section name shown in header 61(*i*)(0) in FIG. 3. Similarly, the value associated with the property can be updated using only the property name, and not using an additional facility such as the section name shown in header 61(*i*)(0).

Numerous modifications may also be made to the operations performed by the computer system in using the section/property value file 60 and the section/property name file 70 in facilitating an updating of the section/property value file 60. Although one arrangement, described in connection with FIGS. 4A through 4C, the computer system has been described as retrieving the section/property value file 70 section-by-section as the operator selects each section name from the information entry element 44, and also updating the file 60 from the dynamic dialog box's buffer section-by-section after the operator actuates the OK push-button 50, it will be appreciated that the computer system may instead retrieve the entire contents of the section/property value file 60 and buffer it in the dynamic dialog box's buffer, update the contents of the buffer in the manner described above in connection with FIGS. 4A through 4C for updating the file 60, and, in response to the operator's actuation of the OK push-button 50, transferring the contents of the dynamic dialog box's buffer to the file 60.

The invention provides a number of advantages. In particular, it enables a program developer to develop dialog boxes which may be easily modified by modifying the contents of a source file (here the section/property name file 70) which, in the case of the illustrative embodiment, is merely an ASCII text file. Since the dialog boxes may be easily modified, only minimal debugging of such dialog boxes may required.

The various elements of the window 20 as described above are generally typical of a window provided by the Microsoft Windows™ operating system for an applications program, but the specific elements and windowing facilities used by an applications program will depend on that particular applications program, and so window 20 is intended to be merely illustrative of windows for applications programs and operating system programs which may advantageously make use of the dynamic dialog box 40 in accordance with the invention.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An information input subsystem for inputting information to a computer system comprising:

A. an editable information type source file including a plurality of information text entries in a text form that is editable by a user using a conventional text editor;

B. an editable information value file including plurality of value entries each for storing a value; and C. a dynamic dialog box processor for retrieving text entries from said information type source file for use in generating a dialog box for display to an operator, the dynamic dialog box processor selectively displaying said information text entries from said information type source file in the displayed dialog box, the dynamic dialog box processor receiving input information values provided by an operator in connection with respective ones of the displayed information text entries to update the values in the value entries in the information value file.

2. An information input subsystem as defined in claim 1 further including a display for displaying information to an operator and an operator input device for receiving information from an operator, and in which said dynamic dialog box processor includes:

A. a dynamic dialog box generator for generating the dynamic dialog box, the dynamic dialog box including a plurality of entries each including an information text entry from said information type source file, the dynamic dialog box generator enabling the display to display the dynamic dialog box generated thereby to enable the operator to provide an updated value associated with each respective information text entry; and B. an information value file update element for receiving said updated values and using the updated values to update the value entries in the information value file.

3. An information input subsystem as defined in claim 2 in which the dynamic dialog box generator includes:

A. a text entry retrieval element for retrieving said information text entries from said information source file;

B. a dynamic dialog box entry generator for generating, in response to each information text entry retrieved by said text entry retrieval element, a dynamic dialog box entry including the information text entry and a current value associated with the information text entry from the information value file; and C. a dynamic dialog box display enabling element for enabling the display to display the dynamic dialog box including each dynamic dialog box entry generated by the dynamic dialog box entry generation generator.

4. An information input subsystem as defined in claim 3 in which the dynamic dialog box entry generator maintains the current value as a blank value if it determines that the information value file does not contain a current value associated with a information text entry.

5. An information input subsystem as defined in claim 2 in which said information source file is divided into a plurality of sections, each identified by a section identifier, said dynamic dialog box generator further generating said dynamic dialog box as including a section identifier portion identifying said sections to facilitate selection of a section by the operator, the dynamic dialog box including a plurality of entries each including an information text entry from the section of the information type source file identified by said operator.

6. An information input subsystem as defined in claim 5 in which the dynamic dialog box generator includes:

A. a text entry retrieval element for retrieving said information text entries from the section of the said information source file identified by said operator;

B. a dynamic dialog box entry generator for generating, in response to each information text entry retrieved by said text entry retrieval element, a dynamic dialog box entry including the information text entry and a current value associated with the information text entry from the information value file; and C. a dynamic dialog box display enabling element for enabling the display to display the dynamic dialog box including each dynamic dialog box entry generated by the dynamic dialog box entry generation generator.

7. An information input subsystem as defined in claim 6 in which the dynamic dialog box entry generator maintains the current value as a blank value if it determines that the information value file does not contain a current value associated with a information text entry.

8. An information input subsystem as defined in claim 2 in which said dynamic dialog box generator generates the dynamic dialog box to include an actuable pushbutton which, when actuated, enables the information value file update element to use the updated value provided by the operator to update the information value file.

9. An information input subsystem as defined in claim 2 in which said dynamic dialog box generator generates the dynamic dialog box to include an actuable pushbutton which, when actuated, enables the information value file update element to close the dynamic dialog box with the information value file update element not updating the information value file.

10. An information update system comprising a computer system controlled by a control subsystem A. the computer system including a display device for displaying information to an operator and an operator input device for receiving information from the operator, the computer system further including an editable information type source file including a plurality of information text entries in a text form that is editable by a user using a conventional text editor and an information value file including plurality of value entries each for storing a value; and B. the control subsystem including a dynamic dialog box enabling element for enabling the computer system to generate a dialog box for display to an operator, the dynamic dialog box enabling element enabling said computer system to selectively retrieve said information text entries from said information type source file for display in the displayed dialog box, the dynamic box enabling element enabling the computer system to receive input information values from the information input device provided by an operator in connection with respective ones of the displayed information text entries and use the received input information values to update the values in the value entries in the information value file.

11. An information update system as defined in claim 10 in which said dynamic dialog box enabling element includes:

A. a dynamic dialog box generation enabling element for enabling said computer system to generate the dynamic dialog box for display by the display device, the dynamic dialog box including a plurality of entries each including an information text entry from said information type source file thereby to enable the operator to provide an updated value associated with each respective information text entry; and B. an information value file update enabling element for enabling the computer system to said updated values and use the updated values to update the value entries in the information value file.

12. An information update system as defined in claim 11 in which the dynamic dialog box generation enabling element includes:

A. a text entry retrieval enabling element for enabling the computer system to retrieve said information text entries from said information source file;

B. a dynamic dialog box entry generation enabling element for enabling the computer system to generate, in response to each retrieved information text entry, a dynamic dialog box entry including the information text entry and a current value associated with the information text entry from the information value file; and C. a dynamic dialog box display enabling element for enabling the computer system to display the dynamic dialog box including each dynamic dialog box entry generated by the dynamic dialog box entry generation generator.

13. An information update system as defined in claim 12 in which the dynamic dialog box entry generation enabling element enables said computer system to maintain the current value as a blank value if determines that the information value file does not contain a current value associated with a information text entry.

14. An information update system as defined in claim 11 in which said information source file is divided into a plurality of sections, each identified by a section identifier, said dynamic dialog box generation enabling element further enabling said computer system to generate said dynamic dialog box as including a section identifier portion identifying said sections to facilitate selection of a section by the operator, the dynamic dialog box including a plurality of entries each including an information text entry from the section of the information type source file identified by said operator.

15. An information update system as defined in claim 14 in which the dynamic dialog box generation enabling element includes:
  A. a text entry retrieval enabling element for enabling said computer system to retrieve said information text entries from the section of the said information source file identified by said operator;
  B. a dynamic dialog box entry generation enabling element for enabling said computer system to generate, in response to each information text entry retrieved by said computer system, a dynamic dialog box entry including the information text entry and a current value associated with the information text entry from the information value file; and
  C. a dynamic dialog box display enabling element for enabling the computer system to display the dynamic dialog box including each dynamic dialog box entry generated by said computer system as enabled by said dynamic dialog box entry generation enabling element.

16. An information update system as defined in claim 15 in which the dynamic dialog box entry generation enabling element enables the computer system to maintains the current value as a blank value if it determines that the information value file does not contain a current value associated with a information text entry.

17. An information update system as defined in claim 11 in which said dynamic dialog box generation enabling element enables the computer system to generate the dynamic dialog box to include an actuable pushbutton which, when actuated, enables the computer system, under control of the information value file update enabling element, to use the updated value provided by the operator to update the information value file.

18. An information update system as defined in claim 11 in which said dynamic dialog box generation enabling element enables the computer system to generate the dynamic dialog box to include an actuable pushbutton which, when actuated, enables the computer system to close the dynamic dialog box without updating the information value file.

19. A control subsystem for use in connection with a computer system to enable the computer system to use information text entries in an editable information type source file, the information text entries being in a text form that is editable by a user using a conventional text editor, to update values in an value entries in an information value file, the control subsystem including a dynamic dialog box enabling element including:
  A. a dynamic dialog box generation enabling element for enabling said computer system to generate a dynamic dialog box for display to an operator by a display device, the dynamic dialog box including a plurality of entries each including an information text entry retrieved from said information type source file thereby to enable the operator to provide an updated value associated with each respective information text entry; and
  B. an information value file update enabling element for enabling the computer system to said updated values and use the updated values to update the value entries in the information value file.

20. A control subsystem as defined in claim 19 in which the dynamic dialog box generation enabling element includes:
  A. a text entry retrieval enabling element for enabling the computer system to retrieve said information text entries from said information source file;
  B. a dynamic dialog box entry generation enabling element for enabling the computer system to generate, in response to each retrieved information text entry, a dynamic dialog box entry including the information text entry and a current value associated with the information text entry from the information value file; and
  C. a dynamic dialog box display enabling element for enabling the computer system to display the dynamic dialog box including each dynamic dialog box entry generated by the dynamic dialog box entry generation generator.

21. A control subsystem as defined in claim 20 in which the dynamic dialog box entry generation enabling element enables said computer system to maintain the current value as a blank value if determines that the information value file does not contain a current value associated with a information text entry.

22. A control subsystem as defined in claim 19 in which said information source file is divided into a plurality of sections, each identified by a section identifier, said dynamic dialog box generation enabling element further enabling said computer system to generate said dynamic dialog box as including a section identifier portion identifying said sections to facilitate selection of a section by the operator, the dynamic dialog box including a plurality of entries each including an information text entry from the section of the information type source file identified by said operator.

23. A control subsystem as defined in claim 22 in which the dynamic dialog box generation enabling element includes:
  A. a text entry retrieval enabling element for enabling said computer system to retrieve said information text entries from the section of the said information source file identified by said operator;
  B. a dynamic dialog box entry generation enabling element for enabling said computer system to generate, in response to each information text entry retrieved by said computer system; a dynamic dialog box entry including the information text entry and a current value associated with the information text entry from the information value file; and
  C. a dynamic dialog box display enabling element for enabling the computer system to display the dynamic dialog box including each dynamic dialog box entry generated by said computer system as enabled by said dynamic dialog box entry generation enabling element.

24. A control subsystem as defined in claim 23 in which the dynamic dialog box entry generation enabling element enables the computer system to maintains the current value as a blank value if it determines that the information value file does not contain a current value associated with a information text entry.

25. A control subsystem as defined in claim 19 in which said dynamic dialog box generation enabling element enables the computer system to generate the dynamic dialog box to include an actuable pushbutton which, when actuated, enables the computer system, under control of the information value file update enabling element, to use the updated value provided by the operator to update the information value file.

26. A control subsystem as defined in claim 19 in which said dynamic dialog box generation enabling element enables the computer system to generate the dynamic dialog box to include an actuable pushbutton which, when actuated, enables the computer system to close the dynamic dialog box without updating the information value file.

27. A computer program product comprising a computer system usable medium having computer system readable code embodied therein for causing a computer system to use information text entries in an editable information type source file, the information text entries being in a text form that is editable by a user using a conventional text editor, to update values of value entries in an information value file, the computer system program product including:

A. computer readable program code devices configured to cause a computer system to effect generation of a dynamic dialog box for display to an operator by a display device, the dynamic dialog box including a plurality of entries each including an information text entry retrieved from said information type source file thereby to enable the operator to provide an updated value associated with each respective information text entry; and B. computer readable program code devices configured to cause a computer system to effect update of the value entries in the information value file using the updated values.

28. A computer program product as defined in claim 27 in which the computer readable program code devices configured to cause a computer system to effect generation of a dynamic dialog box includes A. computer readable program code devices for enabling the computer system to retrieve said information text entries from said information source file;

B. computer readable program code devices for enabling the computer system to generate, in response to each retrieved information text entry, a dynamic dialog box entry including the information text entry and a current value associated with the information text entry from the information value file; and C. computer readable program code devices for enabling the computer system to display the dynamic dialog box including each dynamic dialog box entry generated by the dynamic dialog box entry generation generator.

29. A computer program product as defined in claim 28 in which the computer readable program code devices for enabling the computer system to generate a dynamic dialog box entry in response to each retrieved information text entry enable said computer system to maintain the current value as a blank value if determines that the information value file does not contain a current value associated with a information text entry.

30. A computer program product as defined in claim 27 in which said information source file is divided into a plurality of sections, each identified by a section identifier, the computer readable program code devices configured to cause a computer system to effect generation of a dynamic dialog box further enabling said computer system to generate said dynamic dialog box as including a section identifier portion identifying said sections to facilitate selection of a section by the operator, the dynamic dialog box including a plurality of entries each including an information text entry from the section of the information type source file identified by said operator.

31. A computer program product as defined in claim 30 in which the computer readable program code devices configured to cause a computer system to effect generation of a dynamic dialog box includes:

A. computer readable program code devices configured to cause a computer system to retrieve said information text entries from the section of the said information source file identified by said operator;

B. computer readable program code devices configured to cause a computer system to generate, in response to each retrieved information text entry, a dynamic dialog box entry including the information text entry and a current value associated with the information text entry from the information value file; and C. computer readable program code devices configured to cause a computer system to display the dynamic dialog box including each dynamic dialog box entry generated by said computer system as enabled by said dynamic dialog box entry generation enabling element.

32. A computer program product as defined in claim 31 in which the computer readable program code devices configured to cause a computer system to generate a dynamic dialog box entry in response to each information text entry enables the computer system to maintains the current value as a blank value if it determines that the information value file does not contain a current value associated with a information text entry.

33. A computer program product as defined in claim 27 in which said computer readable program code devices configured to cause a computer system to effect generation of a dynamic dialog box including an actuable pushbutton which, when actuated, enables the computer system to, in turn, use the computer readable program code devices configured to cause a computer system to effect update of the value entries in the information value file using the updated values.

34. A computer program product as defined in claim 27 in which said computer readable program code devices configured to cause a computer system to effect generation of a dynamic dialog box enables the computer system to generate the dynamic dialog box to include an actuable pushbutton which, when actuated, enables the computer system to close the dynamic dialog box without updating the information value file.

35. A method of using information text entries in an information type source file, the information text entries being in a text form that is editable by a user using a conventional text editor, in connection with updating values in an information value file, the method including the steps of:

A. generating a dynamic dialog box for display to an operator, the dynamic dialog box including a plurality of entries each including an information text entry retrieved from said information type source file thereby to enable the operator to provide an updated value associated with each respective displayed information text entry; and B. using the updated values to update the value entries in the information value file.

36. A method as defined in claim 35 in which the dynamic dialog box generation step includes the steps of:

A. retrieving said information text entries from said information source file;

B. generating, in response to each retrieved information text entry, a dynamic dialog box entry including the information text entry and a current value associated with the information text entry from the information value file; and C. displaying the dynamic dialog box including each dynamic dialog box entry.

37. A method as defined in claim 36 in which the dynamic dialog box entry generation step includes the step of maintaining the current value as a blank value if the information value file does not contain a current value associated with a information text entry.

38. A method as defined in claim 35 in which said information source file is divided into a plurality of sections, each identified by a section identifier, said dynamic dialog box generation step including the steps of identifying said sections to facilitate selection of a section by the operator, and generating the dynamic dialog box to include a plurality of entries each including an information text entry from the section of the information type source file identified by said operator.

39. A method as defined in claim 38 in which the dynamic dialog box generation step includes the steps of:
   A. retrieving information text entries from the section of the said information source file identified by said operator;
   B. generating, in response to each retrieved information text entry, a dynamic dialog box entry including the information text entry and a current value associated with the information text entry from the information value file; and
   C. displaying the dynamic dialog box including each generated dynamic dialog box entry.

40. A method as defined in claim 39 in which the dynamic dialog box entry generation step includes the step of maintaining the current value as a blank value if the information value file does not contain a current value associated with a information text entry.

41. A method as defined in claim 35 in which said dynamic dialog box generation step includes the step of generating the dynamic dialog box to include an actuable pushbutton which, when actuated, enables use of the updated value provided by the operator to update the information value file.

42. A method as defined in claim 35 in which said dynamic dialog box generation step includes the step of generating the dynamic dialog box to include an actuable pushbutton which, when actuated, enables closure of the dynamic dialog box without the information value file being updated.

43. A method of controlling a computer system to use information text entries in an editable information type source file, the information text entries being in a text form that is editable by a user using a conventional text editor, in connection with updating values in an value entries in an information value file, the method including the steps of:
   A. enabling the computer system to generate the dynamic dialog box for display to an operator, the dynamic dialog box including a plurality of entries each including an information text entry retrieved from said information type source file thereby to enable the operator to provide an updated value associated with each respective information text entry; and
   B. enabling the computer system to use the updated values to update the value entries in the information value file.

44. A method as defined in claim 43 in which the dynamic dialog box generation enabling step includes the steps of:
   A. enabling the computer system to retrieve said information text entries from said information source file;
   B. enabling the computer system to generate, in response to each retrieved information text entry, a dynamic dialog box entry including the information text entry and a current value associated with the information text entry from the information value file; and
   C. enabling the computer system to display the dynamic dialog box including each dynamic dialog box entry.

45. A method as defined in claim 44 in which the dynamic dialog box entry generation enabling step includes the step of enabling the computer system to maintain the current value as a blank value if it determines that the information value file does not contain a current value associated with a information text entry.

46. A method as defined in claim 45 in which said information source file is divided into a plurality of sections, each identified by a section identifier, said dynamic dialog box generation enabling step including the steps of enabling the computer system to identify said sections to facilitate selection of a section by the operator, and enabling the computer system to generate the dynamic dialog box to include a plurality of entries each including an information text entry from the section of the information type source file identified by said operator.

47. A method as defined in claim 44 in which the dynamic dialog box generation enabling step includes the steps of:
   A. enabling the computer system to retrieve information text entries from the section of the said information source file identified by said operator;
   B. enabling the computer system to generate, in response to each retrieved information text entry, a dynamic dialog box entry including the information text entry and a current value associated with the information text entry from the information value file; and
   C. enabling the computer system to display the dynamic dialog box including each generated dynamic dialog box entry.

48. A method as defined in claim 47 in which the dynamic dialog box entry generation enabling step includes the step of enabling the computer system to maintain the current value as a blank value if it determines that the information value file does not contain a current value associated with a information text entry.

49. A method as defined in claim 43 in which said dynamic dialog box generation enabling step includes the step of enabling the computer system to generate the dynamic dialog box so as to include an actuable pushbutton which, when actuated, enables the computer system to use the updated value provided by the operator to update the information value file.

50. A method as defined in claim 43 in which said dynamic dialog box generation enabling step includes the step of enabling the computer system to generate the dynamic dialog box so as to include an actuable pushbutton which, when actuated, enables the computer system to close the dynamic dialog box without the information value file being updated.

* * * * *